United States Patent [19]
Suda et al.

[11] Patent Number: 5,573,079
[45] Date of Patent: Nov. 12, 1996

[54] ELECTRICALLY OPERATED STEERING APPARATUS

[75] Inventors: Hitoshi Suda; Satoshi Shimada; Susumu Ohta; Junichi Yoshida; Yoshio Kakizaki, all of Saitama, Japan

[73] Assignee: Honda Giken Kogyo Kabushiki Kaisha, Japan

[21] Appl. No.: 473,367

[22] Filed: Jun. 7, 1995

[30] Foreign Application Priority Data

Jul. 13, 1994 [JP] Japan .................................. 6-161531

[51] Int. Cl.$^6$ ........................................... B62D 5/04
[52] U.S. Cl. ............................. 180/444; 180/446
[58] Field of Search ........................ 180/443, 444, 180/445, 446

[56] References Cited

U.S. PATENT DOCUMENTS

| | | | |
|---|---|---|---|
| 4,907,668 | 3/1990 | Onishi et al. | 180/443 |
| 4,986,381 | 1/1991 | Morishita et al. | 180/446 |
| 5,257,828 | 11/1993 | Miller et al. | 180/446 |
| 5,355,315 | 10/1994 | Daido et al. | 180/446 X |
| 5,437,349 | 8/1995 | Kurahashi et al. | 180/446 |

FOREIGN PATENT DOCUMENTS

| | | |
|---|---|---|
| 60-234069 | 11/1985 | Japan . |
| 61-119467 | 6/1986 | Japan . |
| 4-27743 | 7/1992 | Japan . |

*Primary Examiner*—Kevin Hurley
*Attorney, Agent, or Firm*—Merchant, Gould, Smith, Edell, Welter & Schmidt

[57] ABSTRACT

An electrically operated steering apparatus for use on a motor vehicle has a cylindrical housing, an axially movable rack shaft disposed in the housing for steering steerable wheels coupled to the rack shaft, and an electric motor disposed in the cylindrical housing around the axially movable shaft for moving the axially movable shaft. A power supply for supplying electric energy to the electric motor is disposed outside of the cylindrical housing. A motor control circuit for generating a motor control signal based on a detected steering torque is disposed in the cylindrical housing. A motor driver circuit is disposed in the cylindrical housing for energizing the electric motor with the electric energy supplied from the power supply based on the motor control signal. An insert-molded board is disposed in the housing and electrically interconnecting the electric motor, the motor control circuit, and the motor driver circuit. The insert-molded board comprises electric conductors and a body of synthetic resin molded around the electric conductors.

18 Claims, 5 Drawing Sheets

ELECTRICALLY OPERATED STEERING APPARATUS

BACKGROUND OF THE INVENTION

1. Field of the Invention

The present invention relates to an electrically operated steering apparatus for steering steerable vehicle wheels, such as front wheels or rear wheels, with assistive steering forces generated by an electric motor.

2. Description of the Related Art

Conventional electrically operated power steering apparatus for motor vehicles have a rack shaft for steering steerable wheels and an electric motor positioned in the vicinity of the rack shaft for actuating the rack shaft to generate and apply assistive steering forces to the steerable wheels. The rack shaft and the electric motor are accommodated in a housing located outside of the cabin of the motor vehicle. A power supply, typically a vehicle-mounted battery, for energizing the electric motor is also positioned outside of the cabin. The conventional electrically operated power steering apparatus also have a motor driver circuit comprising power electronic devices such as field-effect transistors (FET) or the like and a motor control circuit for controlling the motor driver circuit based on a detected steering torque. The motor driver circuit and the motor control circuit are positioned in the cabin, and electrically connected to the electric motor in the housing and the power supply by wire harnesses.

With the recent advances in the electronic component technology, electronic components for use in the motor driver circuit and the motor control circuit have become more and more reliable, i.e., have had a longer service life and a higher performance capability. The availability of such reliable electronic components makes it possible for the motor driver circuit and the motor control circuit to be positioned under adverse conditions in the vicinity of the housing which accommodates the rack shaft and the electric motor. The motor driver circuit and the motor control circuit are encased in a water-resistant, humidity-resistant, and vibration-resistant structure and electrically connected to the electric motor and the power supply by wire harnesses. Since a large current is supplied from the power supply to energize the electric motor, the wire harnesses are required to be highly resistant to heat, covered with a thick sheath, and have a high current carrying capacity.

The wire harnesses are connected to the electric motor in the housing, the power supply, the motor driver circuit, the motor control circuit through joints that are protected by water-resistant seals in the form of rubber grommets.

Because the wire harnesses with a high current carrying capacity are drawn directly into the housing for connection to the electric motor, it has been tedious and time-consuming to place the wire harnesses in position and fix them with the grommets.

The protective water-resistant seals or grommets used to protect the joints outside of the cabin pose problems on the ease with which the electrically operated power steering apparatus can be assembled and serviced for maintenance.

SUMMARY OF TEE INVENTION

It is therefore an object of the present invention to provide an electrically operated steering apparatus which has functional blocks that are all accommodated in a housing and interconnected by a wiring board, so that the functional blocks can easily be connected and the electrically operated steering apparatus can efficiently be assembled and serviced for maintenance.

According to the present invention, there is provided an electrically operated steering apparatus comprising a housing, a shaft disposed in the housing for movement to steer steerable wheels coupled to the shaft, an electric motor disposed in the housing and coupled to the shaft for moving the shaft, a power supply disposed outside of the housing for supplying electric energy, motor controlling means disposed in the housing for generating a motor control signal, motor driving means disposed in the housing for energizing the electric motor with the electric energy supplied from the power supply based on the motor control signal, and an insert-molded board disposed in the housing and electrically interconnecting the electric motor, the motor controlling means, and the motor driving means, the insert-molded board comprising electric conductors and a body of synthetic resin molded around the electric conductors.

According to the present invention, there is also provided an electrically operated steering apparatus comprising a cylindrical housing, an axially movable shaft disposed in the housing for steering steerable wheels coupled to the axially movable shaft, an electric motor disposed in the cylindrical housing around the axially movable shaft for moving the axially movable shaft, motor controlling means disposed in the cylindrical housing for generating a motor control signal, motor driving means disposed in the cylindrical housing for energizing the electric motor with electric energy based on the motor control signal, and a wiring board disposed in the cylindrical housing and an electrically interconnecting the electric motor, the motor controlling means, and the motor driving means. The wiring board comprises an insert-molded board comprising electric conductors and a body of synthetic resin molded around the electric conductors.

The body of synthetic resin has attachment holes, the motor driving means being connected to the electric conductors through the attachment holes.

The insert-molded board has an electrically conductive pattern disposed on a surface thereof, the motor controlling means being mounted on the electrically conductive pattern.

The electrically operated steering apparatus further comprises a bearing disposed around the axially movable shaft, the motor driving means being supported on the bearing.

The insert-molded board comprises a cylindrical section and a flat horizontal section integrally joined to and extending from the cylindrical section, the motor controlling means being mounted on the flat horizontal section.

The cylindrical section has attachment holes defined therein, the motor driving means being connected to the electric conductors in the cylindrical section through the attachment holes.

The electrically operated steering apparatus further comprises a printed wiring board supported on the flat horizontal section, the motor control means comprising electronic components mounted on the printed wiring board.

The motor control means comprises electronic components mounted on the flat horizontal section.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
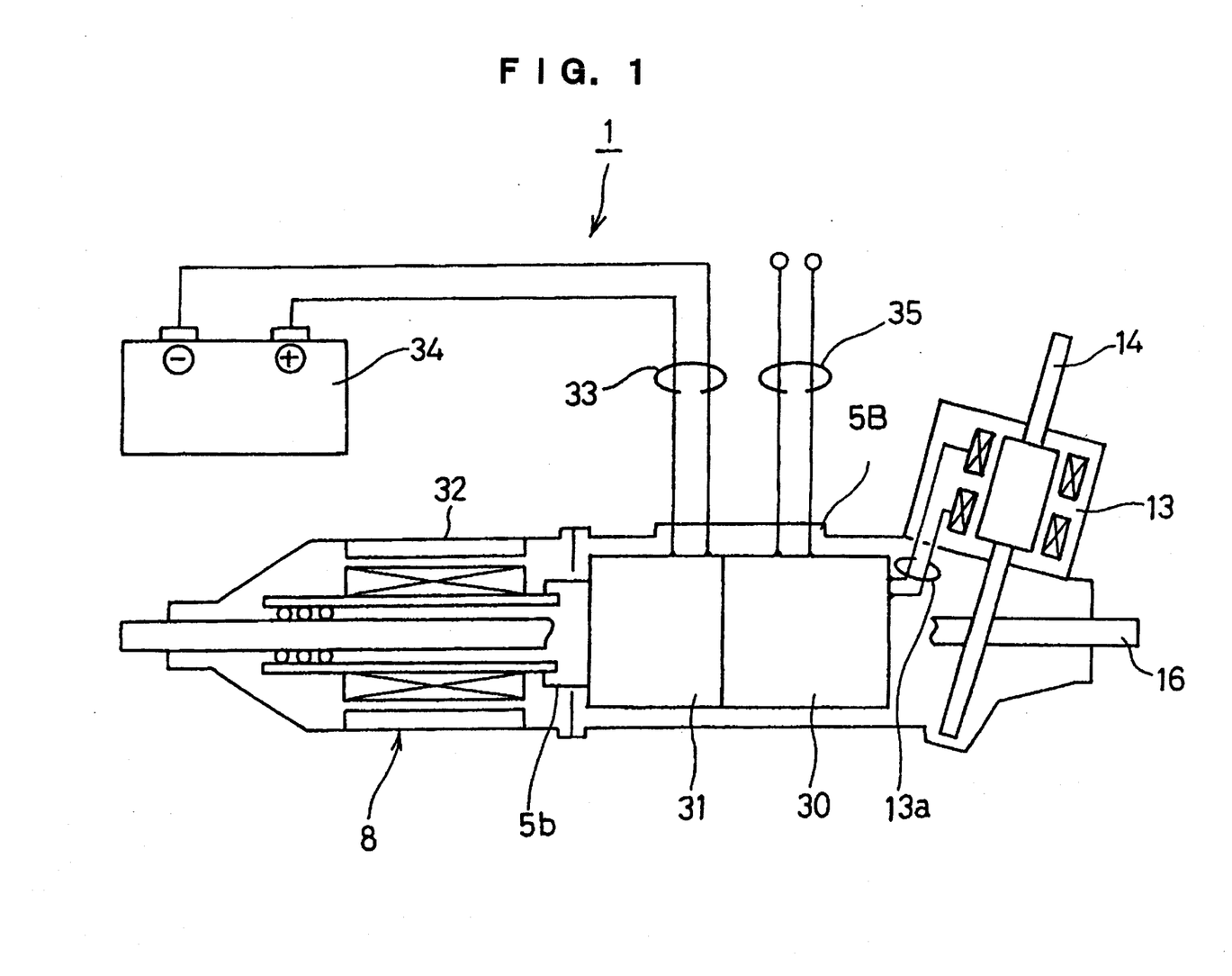
FIG. 1 is a schematic view of an electrically operated steering apparatus according to an embodiment of the present invention.

FIG. 1 schematically shows an electrically operated steering apparatus according to an embodiment of the present invention which is employed as an electrically operated power steering apparatus having a steering shaft coupled to a steering wheel for generating assistive steering forces in steering steerable front wheels of a motor vehicle.

As shown in FIG. 1, the electrically operated power steering apparatus, generally designated by the reference numeral 1, has a steering shaft 14 which can be rotated about its own axis by a manually turned steering wheel (not shown) coupled thereto, and a rack shaft 16 for converting a rotational motion of the steering shaft 14 into a linear longitudinal motion for steering steerable front wheels (not shown) that are coupled to the rack shaft 16.

The electrically operated power steering apparatus 1 also has a torque sensor 13 for detecting a steering torque that is produced when the steering wheel and hence the steering shaft 14 are rotated, a motor control circuit (motor controlling means) 30 for producing a motor control signal based on the steering torque detected by the torque sensor 13, a motor driver circuit (motor driving means) 31 for supplying a driving electric energy (a driving current) based on the motor control signal generated by the motor control circuit 30, and an electric motor 8 energizable by the driving electric energy supplied from the motor driver circuit 31 for generating and applying assistive steering forces corresponding to the detected steering torque to the rack shaft 16 to assist in reducing manual steering forces that are applied to the steering wheel by the driver of the motor vehicle.

The functional blocks of the electrically operated power steering apparatus 1, i.e., the steering shaft 14, the torque sensor 13, the motor control circuit 30, the motor driver circuit 31, and the electric motor 8, are all accommodated in a cylindrical housing 32.

The motor control circuit 30 and the torque sensor 13 are electrically connected to each other by torque sensor connection leads 13a, and the motor driver circuit 31 and the electric motor 8 are electrically connected to each other by motor connection leads 5b.

The motor control circuit 30 and the motor driver circuit 31 are electrically connected to each other by connection wires (not shown). The motor driver circuit 31 is electrically connected to an external power supply 34, typically a 12 V battery on the motor vehicle, by power supply connection wires 33 through a connector 5B on the cylindrical housing 32. The motor control circuit 30 is electrically connected to external sensors and external control circuits (not shown) by external connection wires 35 through the connector 5B.

The motor control circuit 30 is supplied with a torque signal from the torque sensor 13 and low-level signals from the external sensors and the external control circuits, and outputs a low-level motor control signal. Therefore, the motor control circuit 30 may be composed of components of low power requirements. Consequently, the torque sensor connection leads 13a, the external connection wires 35, and the connection wire between the motor control circuit 30 and the motor driver circuit 31 may comprise leads or wires of a relatively small current carrying capacity, or may be in the form of an electrically conductive pattern on a printed wiring board.

The motor driver circuit 31 is supplied with a large electric energy (large current) from the power supply 34 and energizes the electric motor 8 with the supplied electric power. Therefore, the power supply connection wires 33 and the motor connection leads 5b are required to be wires or leads of a relatively large current carrying capacity or bus bars.

Specific structural details of the electrically operated steering apparatus according to the embodiment of the present invention will be described below with reference to FIGS. 2 through 4.

Figure 2:
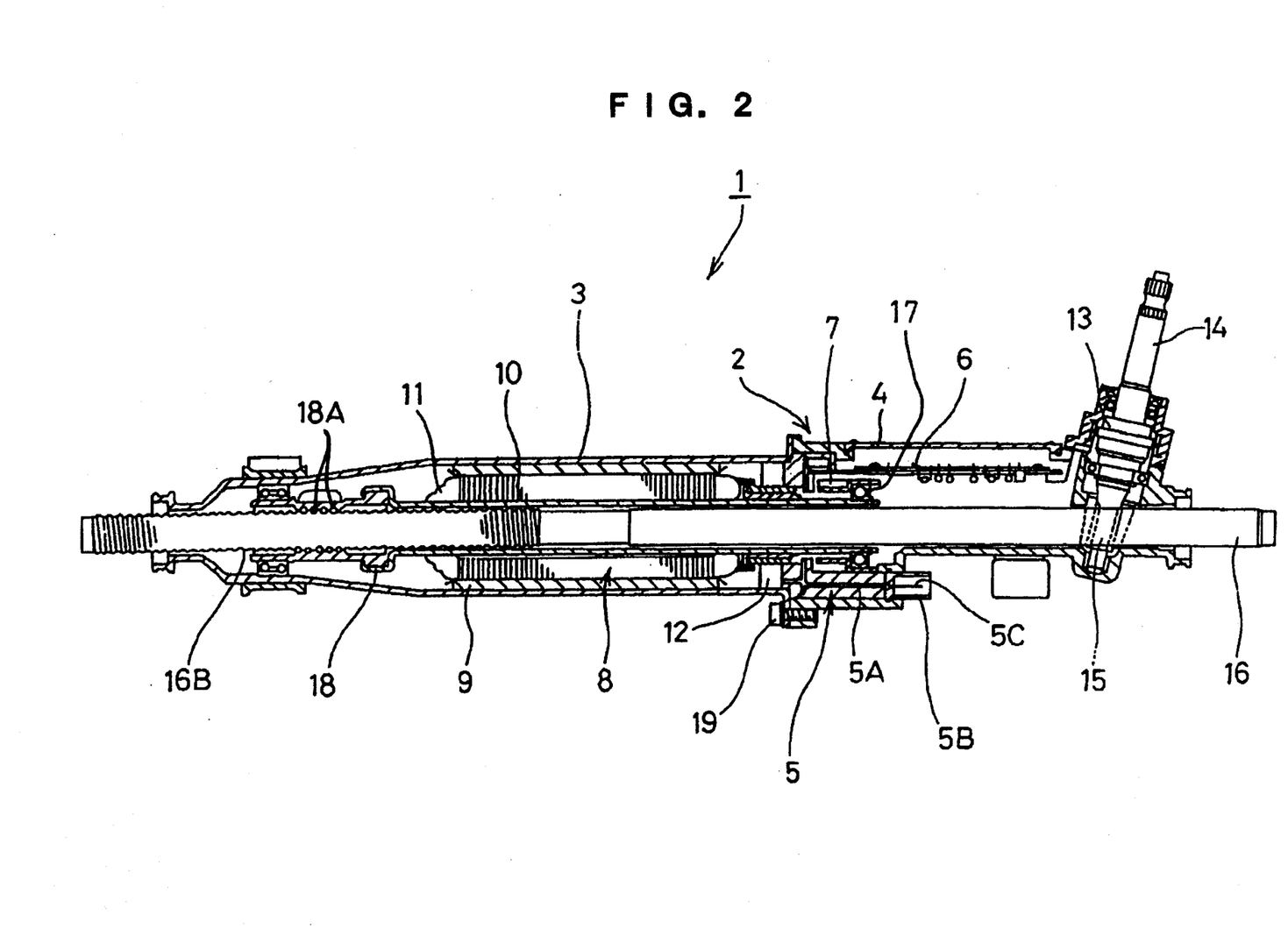
FIG. 2 is a longitudinal cross-sectional view showing specific structural details of the electrically operated steering apparatus according to the embodiment of the present invention.
Figure 3:
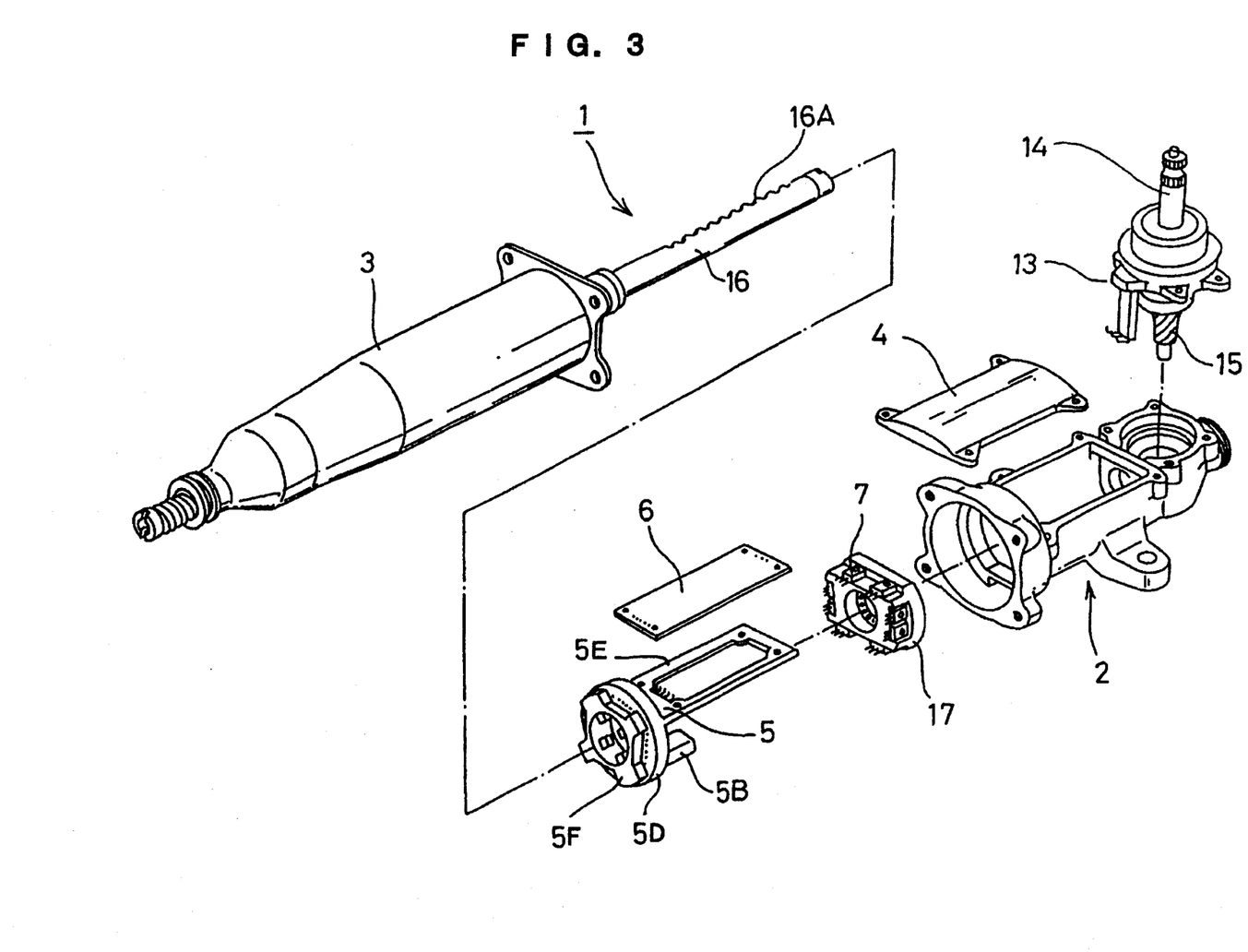
FIG. 3 is an exploded perspective view of the electrically operated steering apparatus shown in FIG. 2.

As shown in FIGS. 2 and 3, the electrically operated power steering apparatus 1 has a gearbox housing 2 and a motor yoke 3 which have respecting mating flanges that are joined to each other by bolts 19. The gearbox housing 2 and the motor yoke 3 thus joined together make up the entire cylindrical housing of the electrically operated power steering apparatus 1.

The rack shaft 16 is inserted longitudinally centrally in the housing and has opposite ends projecting from respective longitudinal ends of the housing and connected to the steerable front wheels by respective tie rods (not shown). When the rack shaft 16 is longitudinally moved along its longitudinal axis, it causes the tie rods to steer the steerable front wheels.

The gearbox housing 2 houses therein a pinion 15 fixed to a lower end of the steering shaft 14. The pinion 15 is held in mesh with rack teeth on the rack shaft 16 for converting a rotational motion of the steering shaft 14 into a linear longitudinal motion of the rack shaft 16.

The electric motor 8, which is housed in the motor yoke 3, comprises a permanent magnet assembly (stator) 9 fixed to and extending along an inner wall of the motor yoke 3, a hollow rotor shaft 10 rotatably disposed around the rack shaft 16 radially inwardly of the permanent magnet assembly 9, and windings 11 wound on the rotor shaft 10. A tubular nut 18 fixed to and axially extending from an end of the rotor shaft 10 and disposed rotatably around the rack shaft 16. The tubular nut 18 is held in mesh with screw threads 16B in an outer circumferential surface of the rack shaft 16 by a plurality of balls 18A rollingly positioned between the tubular nut 18 and the screw threads 16B. The tubular nut 18, the rack shaft 16, and the balls 18A jointly serve as a ball screw mechanism for converting a rotational motion of the tubular nut 18 into a linear axial motion of the rack shaft 16 to generate assistive steering forces to be applied to steer the steerable front wheels.

The gearbox housing 2 accommodates therein a printed wiring board 6 which supports electronic components that make up the motor control circuit 30 (see FIG. 1), a driver support 17 which supports power electronic components including a plurality of FETs 7 that make up the motor driver circuit 31 (see FIG. 1), the driver support 17 doubling as a heat radiator, and an insert-molded board 5 which electrically interconnects the printed wiring board 6, the FETs 7, and brushes 12 of the electric motor 8 which are electrically connected to the windings 11. The driver support 17 is supported on and rotatable relative to an end of the rotor shaft 18 remote from the ball screw mechanism. The gearbox housing 2 has a cover 4 which closes an upper opening defined in the gearbox housing 2 after the printed wiring board 6, the driver support 17, and the insert-molded board 5 have been installed therein.

The printed wiring board 6 has an electrically conductive pattern etched on a copper-clad glass epoxy laminate, with the electronic components mounted thereon and soldered to the electrically conductive pattern. The torque sensor connection leads 13a (see FIG. 4) and connection wires (power supply wires and motor control wires) connected to the insert-molded board 5 are electrically connected to the electrically conductive pattern of the printed wiring board 6.

Figure 4:
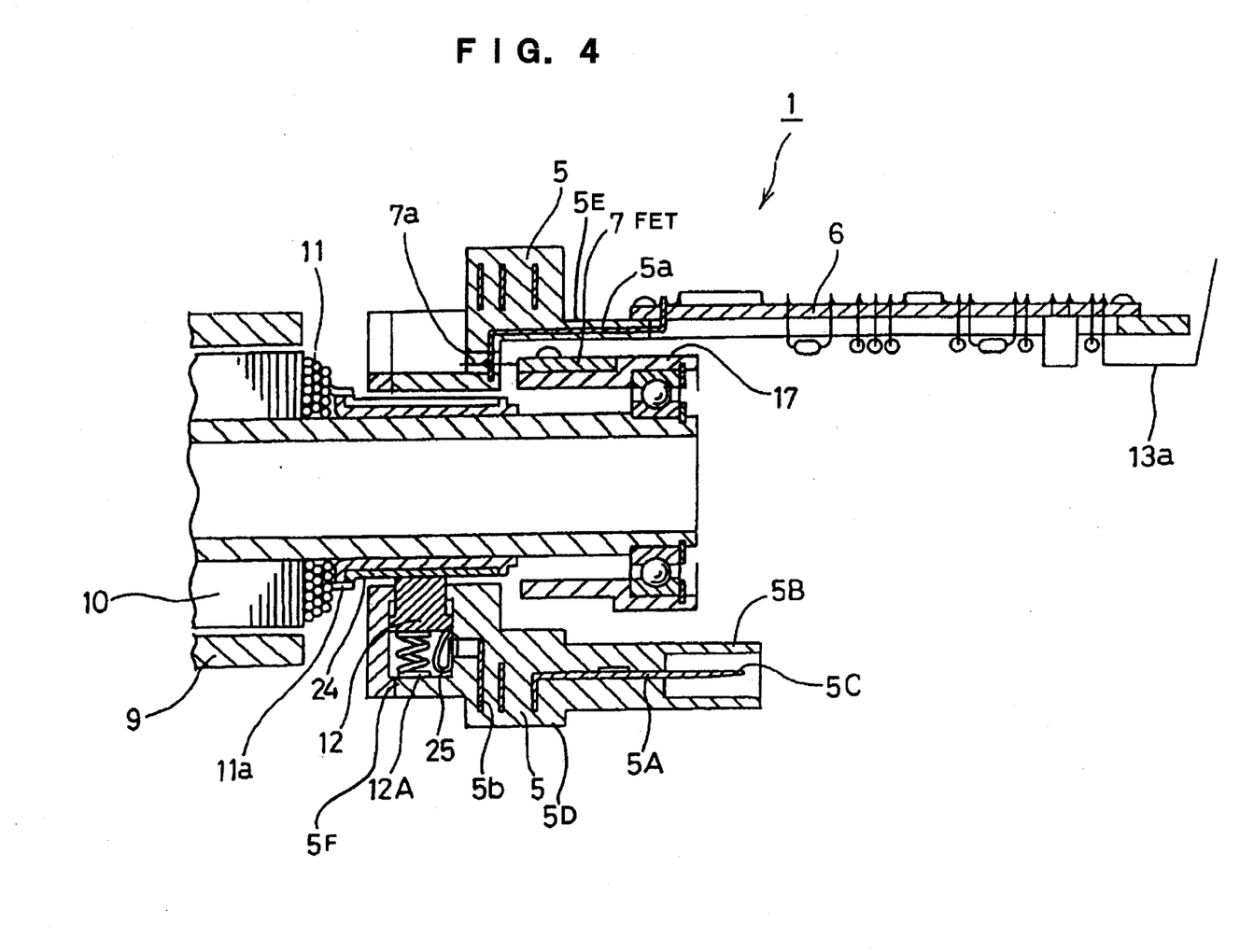
FIG. 4 is an enlarged fragmentary cross-sectional view of the electrically operated steering apparatus shown in FIG. 2.

As shown in FIGS. 3 and 4, the insert-molded board 5 comprises a plurality of lead frames 5A made of an electric conductor which have a large current carrying capacity, and a body of synthetic resin molded around the lead frames 5A. The lead frames 5A jointly serve as a circuit pattern.

The lead frames 5A have ends serving as connector terminals 5C which project out of the molded body of synthetic resin into the connector 5B which is positioned on a lower side of the gearbox housing 2. The connector terminals 5C include connector terminals which carry low-level currents from the external sensors and the external control circuits and connector terminals which carry high-level currents from the power supply 34 (see FIG. 1). These connector terminals 5C are connected to the power supply 34 through the power supply connection wires 33 and to the external sensors, and the external control circuits through the external connection wires 35.

The insert-molded board 5 includes a cylindrical section D and a flat horizontal section E integrally joined to and extending from an upper portion of the cylindrical section D. The connector 5B is joined to and extends horizontally from a lower portion of the cylindrical section D. Specifically, the connector 5B Is integrally molded of synthetic resin with the cylindrical section D so as to surround the connector terminals 5C. Because the connector terminals 5C are surrounded by the connector B, electric joints between the connector terminals 5C and companion connector terminals are sealed and protected securely.

The printed wiring board 6 is mounted on the flat horizontal section E. The flat horizontal section E has a central opening defined therein which provides an installation space for the electronic components mounted on the printed wiring board 6.

The lead frames 5A includes lead frames 5a, 5b. The lead frames 5a have ends projecting from the insert-molded board 5 and connected to the conductive pattern on the printed wiring board 6 that is mounted on the flat horizontal section E of insert-molded board 5. The molded body of synthetic resin of the insert-molded board 5 has attachment holes defined in the cylindrical section 5D where the lead frames 5a pass. The FETs 7 supported on the driver support 17 have leads 7a that extend through the attachment holes and are soldered to the lead frames 5a.

The insert-molded board 5 includes a brush case 5F integrally formed with the cylindrical section 5D and housing the brushes 12 of the electric motor 8. The lead frames 5b have ends arc-welded to ends of connection wires 25 whose other ends are arc-welded to the brushes 12. The brushes 12 are normally biased by springs 12A radially inwardly into contact with an armature 24 disposed around the tubular nut 18. The armature 24 has an axial end which is electrically connected to coil wires 12a of the windings 11 by staking.

Since the lead frames 5A may be arranged in any desired position and in any desired pattern, they can electrically interconnect the printed wiring board 6, the FETs 7, and the electric motor 8 without the need for separate connection wires or leads.

The electrically operated power steering apparatus 1 can be assembled as follows:

As shown in FIG. 3, the printed wiring board 6 is mounted on the flat horizontal section 5E of the insert-molded board 5. Thereafter, the leads 7a (see FIG. 4) of the FETs 7 on the driver support 17 are soldered to the lead frames 5a through the attachment holes. The insert-molded board 5 with the printed wiring board 6 mounted thereon, and the driver support 17 are then placed on the rack shaft 16 combined with the motor yoke 3. The gearbox housing 2 is brought over the insert-molded board 5, the printed wiring board 6, and the driver support 17 on the rack shaft 16. The flanges of the motor yoke 3 and the gearbox housing 2 are fastened to each other by the bolts 19. The steering shaft 14 is inserted until the pinion 15 is held in mesh with the rack teeth 16A, and secured in position with respect to the gearbox housing 2. Thereafter, the upper opening of the gearbox housing 2 is closed by the cover 4.

Figure 5:
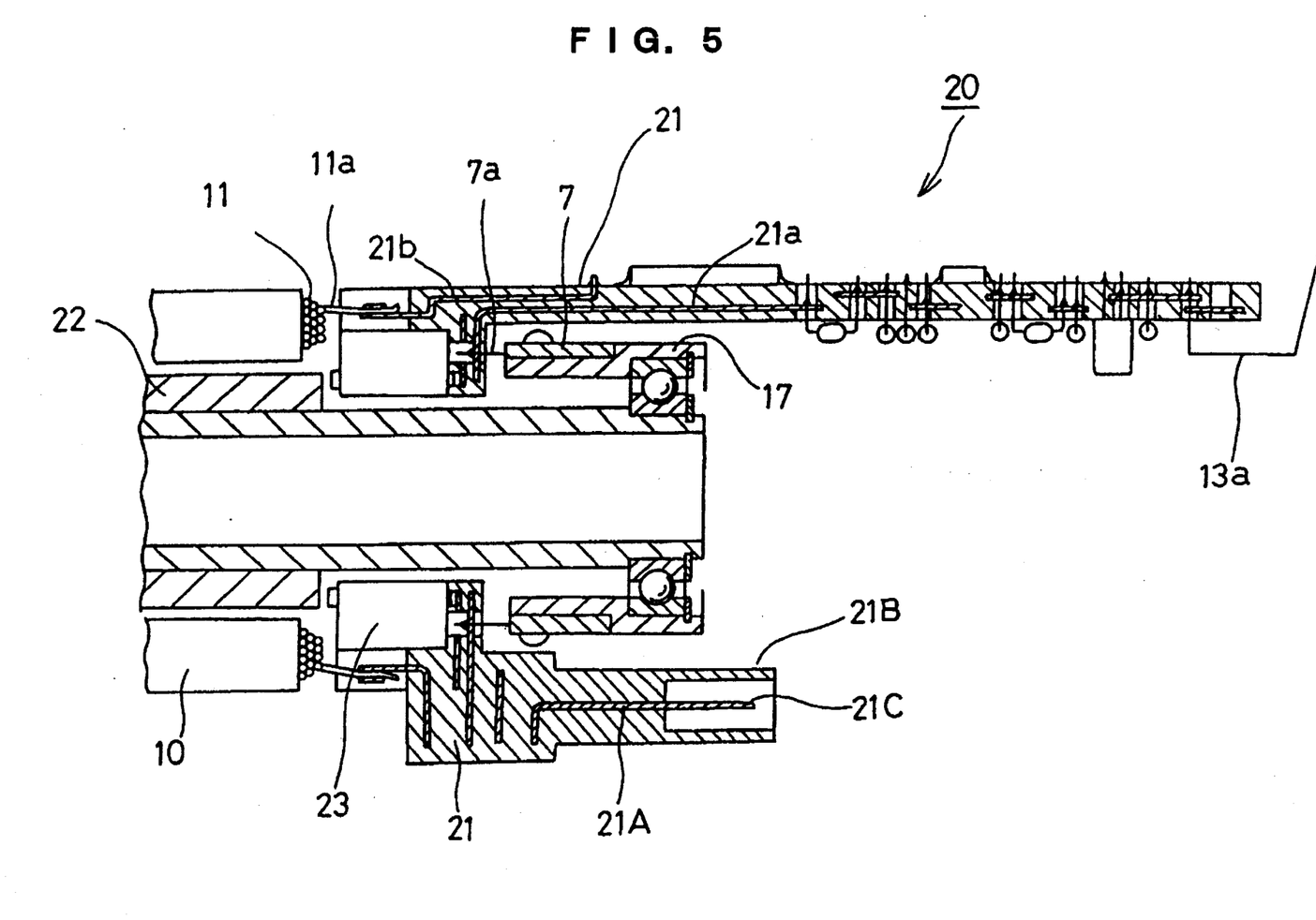
FIG. 5 is a longitudinal cross-sectional view of an electrically operated steering apparatus according to another embodiment of the present invention.

FIG. 5 shows an electrically operated steering apparatus according to another embodiment of the present invention. The electrically operated steering apparatus, generally designated by the reference numeral 20 in FIG. 5, has a brushless electric motor for generating assistive steering forces.

As shown in FIG. 5, the electrically operated steering apparatus 20 has an insert-molded board 21 comprising a plurality of lead frames 21A made of an electric conductor, and a body of synthetic resin molded around the lead frames 21A.

The synthetic resin molded around the lead frames 21A comprises a first synthetic resin containing a catalyst and a second synthetic resin free of a catalyst. The insert-molded board 21 has an electrically conductive pattern deposited by electroless plating on its surface which is made up of the first synthetic resin. Electronic components of a motor control circuit, which corresponds to the motor control circuit 30 shown in FIG. 1, are mounted on the insert-molded board 21 and electrically connected to the electrically conductive pattern thereon.

Specifically, the electronic components of the motor control circuit include axial components, radial components, specially shaped components, and surface-mounted components such as chips and flat ICs. The axial components, the radial components, and the specially shaped components are soldered to the lead frames 21A through attachment holes defined in the insert-molded board 21, and the surface-mounted components are soldered to the electrically conductive pattern on the surface of the insert-molded board 21. Toque sensor connection leads 13a are soldered to the lead frames 21A.

The lead frames 21A include lead frames 21a, 21b. The lead frames 21a are electrically connected to the electronic components of the motor control circuit and leads 7a of FETs 7 of a motor driver circuit, which corresponds to the motor driver circuit 31 shown in FIG. 1. The lead frames 21b are electrically connected to coil wires 11a of windings 11 of the brushless electric motor.

The brushless electric motor has permanent magnets 22 whose angular position can be detected by a position detector 23 such as a magnetic angular position sensor. The position detector 23 is mounted on the insert-molded board 21 and electrically connected to the motor control circuit through the lead frees 21a.

The electrically operated steering apparatus 20 also has a connector 21B integrally molded with the insert-molded board 21 and surrounding connector terminals 21C which are composed of ends of the lead frames 21A and including connector terminals for carrying large and small currents.

Other details of the electrically operated steering apparatus 20 are the same as those of the electrically operated steering apparatus 1 shown in FIGS. 1 through 4.

In the above embodiments, the electric motor 8, the motor control circuit 30, and the motor driver circuit 31 are electrically interconnected by the insert-molded board 5, 21. Therefore, since the electric motor 8, the motor control circuit 30, and the motor driver circuit 31 can easily be electrically connected to each other, the electrically operated steering apparatus 1, 20 can easily be assembled and serviced for maintenance.

Inasmuch as the motor control circuit 30 and the motor driver circuit 31 are electrically connected to the power supply 34, the external sensors, and the external control circuits only through the connector 5B, 21B, and such electric connections are sealed and protected by the connector 5B, 21B, the electrically operated steering apparatus 1, 20 are highly reliable in operation.

The leads 7a of the FETs 7 of the motor driver circuit 31 are soldered to the lead frames 5a, 21a through the attachment holes in the insert-molded board 5, 21. This arrangement is effective to reduce the size of the electrically operated steering apparatus 1, 20. The size of the electrically operated steering apparatus 1, 20 is also reduced because the motor control circuit 31 is mounted on the printed wiring board 6 on the insert-molded board 5 or directly mounted on the insert-molded board 21.

The illustrated electrically operated steering apparatus has been described as an electrically operated power steering apparatus for generating assistive steering forces in steering steerable front wheels of a motor vehicle. However, the principles of the present invention are also applicable to an electrically operated power steering apparatus for steering steerable rear wheels of a motor vehicle.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An electrically operated steering apparatus comprising:
    a housing;
    a shaft disposed in said housing for movement to steer steerable wheels coupled to the shaft;
    an electric motor disposed in said housing and coupled to said shaft for moving said shaft;
    a power supply disposed outside of said housing for supplying electric energy;
    motor controlling means disposed in said housing for generating a motor control signal;
    motor driving means disposed in said housing for energizing said electric motor with the electric energy supplied from said power supply based on said motor control signal; and
    an insert-molded board disposed in said housing and electrically interconnecting said electric motor, said motor controlling means, and said motor driving means, said insert-molded board comprising electric conductors and a body of synthetic resin molded around said electric conductors.

2. An electrically operated steering apparatus according to claim 1, wherein said insert-molded board has a connector integrally molded of said synthetic resin and surrounding ends of said electric conductors.

3. An electrically operated steering apparatus according to claim 1, wherein said body of synthetic resin has attachment holes, said motor driving means being connected to said electric conductors through said attachment holes.

4. An electrically operated steering apparatus according to claim 1, wherein said insert-molded board has an electrically conductive pattern disposed on a surface thereof, said motor controlling means being mounted on said electrically conductive pattern.

5. An electrically operated steering apparatus according to claim 1, further comprising a driver support disposed around said shaft, said motor driving means being supported on said driver support.

6. An electrically operated steering apparatus according to claim 1, wherein said insert-molded board comprises a cylindrical section and a flat horizontal section integrally joined to and extending from said cylindrical section, said motor controlling means being mounted on said flat horizontal section.

7. An electrically operated steering apparatus according to claim 6, wherein said cylindrical section has attachment holes defined therein, said motor driving means being connected to said electric conductors in said cylindrical section through said attachment holes.

8. An electrically operated steering apparatus according to claim 6, further comprising a printed wiring board supported on said flat horizontal section, said motor control means comprising electronic components mounted on said printed wiring board.

9. An electrically operated steering apparatus according to claim 6, wherein said motor control means comprising electronic components mounted on said flat horizontal section.

10. An electrically operated steering apparatus comprising:
    a cylindrical housing;
    an axially movable shaft disposed in said housing for steering steerable wheels coupled to the axially movable shaft;
    an electric motor disposed in said cylindrical housing around said axially movable shaft for moving said axially movable shaft;
    motor controlling means disposed in said cylindrical housing for generating a motor control signal;
    motor driving means disposed in said cylindrical housing for energizing said electric motor with electric energy based on said motor control signal; and
    a wiring board disposed in said cylindrical housing and electrically interconnecting said electric motor, said motor controlling means, and said motor driving means.

11. An electrically operated steering apparatus according to claim 10, wherein said wiring board comprises an insert-molded board comprising electric conductors and a body of synthetic resin molded around said electric conductors.

12. An electrically operated steering apparatus according to claim 11, wherein said body of synthetic resin has attachment holes, said motor driving means being connected to said electric conductors through said attachment holes.

13. An electrically operated steering apparatus according to claim 11, wherein said insert-molded board has an electrically conductive pattern disposed on a surface thereof, said motor controlling means being mounted on said electrically conductive pattern.

14. An electrically operated steering apparatus according to claim 11, further comprising a driver support disposed around said axially movable shaft, said motor driving means being supported on said driver support.

15. An electrically operated steering apparatus according to claim 11, wherein said insert-molded board comprises a cylindrical section and a flat horizontal section integrally joined to and extending from said cylindrical section, said motor controlling means being mounted on said flat horizontal section.

16. An electrically operated steering apparatus according to claim 15, wherein said cylindrical section has attachment holes defined therein, said motor driving means being connected to said electric conductors in said cylindrical section through said attachment holes.

17. An electrically operated steering apparatus according to claim 15, further comprising a printed wiring board supported on said flat horizontal section, said motor control means comprising electronic components mounted on said printed wiring board.

18. An electrically operated steering apparatus according to claim 15, wherein said motor control means comprises electronic components mounted on said flat horizontal section.

\* \* \* \* \*